(12) United States Patent
Slovak

(10) Patent No.: US 10,558,728 B2
(45) Date of Patent: *Feb. 11, 2020

(54) SHARED CONTENT DELIVERY STREAMS IN DATA NETWORKS

(71) Applicant: TEALIUM INC., San Diego, CA (US)

(72) Inventor: Christopher B. Slovak, Carlsbad, CA (US)

(73) Assignee: TEALIUM INC., San Deigo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,054

(22) Filed: Sep. 14, 2018

(65) Prior Publication Data

US 2019/0147012 A1 May 16, 2019

Related U.S. Application Data

(63) Continuation of application No. 15/812,790, filed on Nov. 14, 2017, now Pat. No. 10,078,708.

(60) Provisional application No. 62/422,354, filed on Nov. 15, 2016.

(51) Int. Cl.
| | |
|---|---|
| G06F 15/16 | (2006.01) |
| G06F 16/958 | (2019.01) |
| G06Q 30/02 | (2012.01) |
| H04L 29/08 | (2006.01) |
| G06F 16/957 | (2019.01) |

(52) U.S. Cl.
CPC ........ *G06F 16/972* (2019.01); *G06F 16/9574* (2019.01); *G06Q 30/0255* (2013.01); *H04L 67/02* (2013.01); *H04L 67/22* (2013.01)

(58) Field of Classification Search
CPC ... G06F 16/972; G06F 16/9574; H04L 67/02; H04L 67/22; G06Q 30/0255

USPC .......................................................... 709/231
See application file for complete search history.

(56) References Cited

U.S. PATENT DOCUMENTS

| | | |
|---|---|---|
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Anderson |
| 9,116,608 B2 | 8/2015 | Koo et al. |
| 9,313,287 B2 | 4/2016 | Glommen et al. |

(Continued)

OTHER PUBLICATIONS

Kotz et al., "Performance Analysis of Mobile Agents for Filtering Data Streams on Wireless Networks" Mobile Networks and Applications, 2002, vol. 7, No. 2, p. 163 (Year: 2002).*

*Primary Examiner* — Taylor A Elfervig
(74) *Attorney, Agent, or Firm* — Knobbe, Martens, Olson & Bear LLP

(57) ABSTRACT

The systems and methods described herein use a tag for collecting data associated with a content object of a content page. The tag may be a universal tag which can provide a single point of data collection and thereby reduce the number of network requests due to piggyback tags. The data collected from the content page may be communicated to a stream management system which can process the data and split the data into multiple data streams to be fed to a downstream system. The downstream system can further process the data and communicate to another downstream system. In some embodiments, the stream management system can access the repositories of its downstream system and veto the data flows created by the downstream system.

20 Claims, 5 Drawing Sheets

(56) References Cited

U.S. PATENT DOCUMENTS

| | | | |
|---|---|---|---|
| 9,357,023 B2 | 5/2016 | Glommen et al. | |
| 9,363,311 B1 | 6/2016 | McWilliams et al. | |
| 9,479,609 B2 | 10/2016 | Anderson | |
| 9,537,964 B2 | 1/2017 | Glommen et al. | |
| 9,635,100 B2 | 4/2017 | McWilliams et al. | |
| 9,690,868 B2 | 6/2017 | Anderson | |
| 9,753,898 B1 | 9/2017 | Glommen et al. | |
| 9,769,252 B2 | 9/2017 | Glommen et al. | |
| 9,787,795 B2 | 10/2017 | Anderson | |
| 9,807,184 B1 | 10/2017 | Slovak et al. | |
| 2004/0158569 A1* | 8/2004 | Evans | G06F 16/337 |
| 2011/0099284 A1* | 4/2011 | Gallant | G06F 9/544 |
| | | | 709/231 |
| 2013/0055137 A1* | 2/2013 | Choc | G06Q 30/02 |
| | | | 715/772 |
| 2014/0279865 A1* | 9/2014 | Kumar | G06F 16/904 |
| | | | 707/609 |
| 2015/0293974 A1* | 10/2015 | Loo | G06F 16/24568 |
| | | | 707/752 |
| 2016/0267523 A1* | 9/2016 | Biswas | G06Q 30/0244 |
| 2019/0197242 A9* | 6/2019 | Rajcan | G06F 21/575 |

* cited by examiner

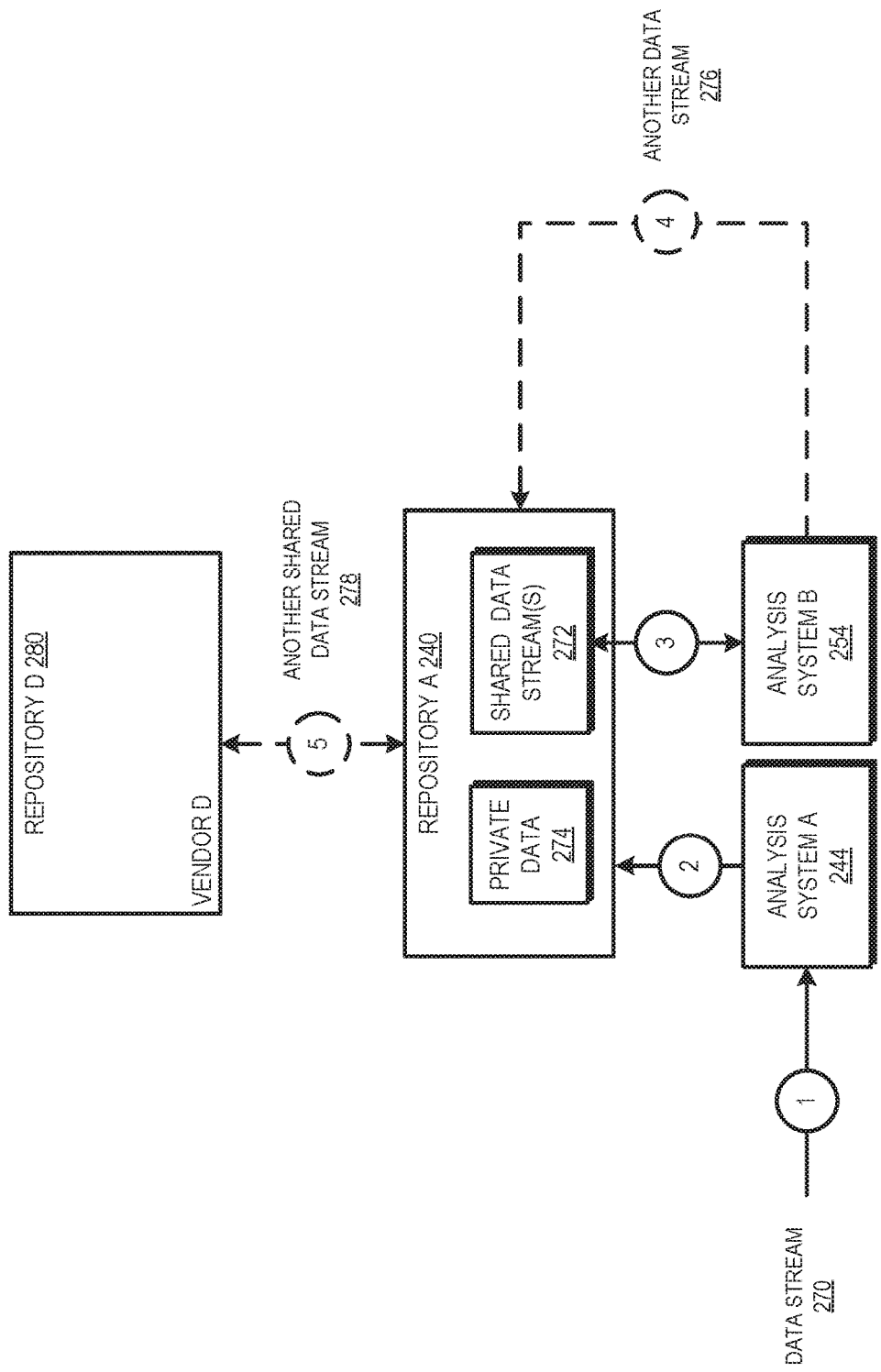

SHARED CONTENT DELIVERY STREAMS IN DATA NETWORKS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Some operators of content sites, such as websites or mobile applications, regularly obtain the results of analytics performed with regard to user interactions on their content sites. User analytics can include any type of data regarding interactions of end users with content sites, among other types of data. There are different approaches to gathering analytics data, one of which includes employing the use of tags, SDKs or APIs.

Tags can include small pieces of website code that allow a website operator to measure traffic and visitor behavior, understand the impact of online advertising and social channels, use remarketing and audience targeting, or test and improve a content site, among other functions. Adding tags to a content site has typically required a developer to manually insert tag codes into one or more pages of a website.

SUMMARY

The systems, methods, and devices of this disclosure each have several innovative aspects, no single one of which is solely responsible for the all of the desirable attributes disclosed herein.

In some embodiments, a system is disclosed for sharing data indicative of user interactions with a content object. The system can include a network interface configured to communicate with a user system; and one or more hardware processors comprising digital logic circuitry in communication with the network interface, the one or more hardware processors being configured to: receive from a user system, via a computer network, data indicative of user interactions with a content object of a content page, the data indicative of user interactions being transmitted by the user system to the network interface in response the user system executing a tag object comprising instructions to gather the data indicative of user interactions and transmit the data indicative of user interactions; access a first event filter corresponding to the content object from a plurality of event filters; generate a plurality of data streams from the data indicative of user interactions by filtering the data indicative of user interactions using the first event filter, the plurality of data streams comprising: a first data stream comprising a first data set of the data indicative of user interactions, and a second data stream comprising a second data set of the data indicative of user interactions which first data stream does not, the second data set being different from the first data set; access a second event filter corresponding to the content object from the plurality of event filters, the second event filter being different from the first event filter; generate a plurality of sub-data streams from the first data stream by filtering the first data stream using the second event filter, the plurality of sub-data streams comprising: a first sub-data stream comprising a first data subset of the first data stream, and a second sub-data stream comprising a second data subset of the first data stream which the first sub-data stream does not, the second data subset being different from the first data subset; and output the second data stream, the first sub-data stream, and the second sub-data stream to a plurality of analysis systems such that a first group of the plurality of analysis systems is prevented from accessing data of the second data stream, a second group of the plurality of analysis systems is prevented from accessing data of the first sub-data stream, and a third group of the plurality of analysis systems is prevented from accessing data of the second sub-data stream, the first group comprising at least some different analysis systems of the plurality of analysis systems from the second group and the third group, the second group comprising at least some different analysis systems of the plurality of analysis systems from the third group.

The system of preceding paragraph can include the following features: The one or more hardware processors is configured to access the first event filter by: determining an identifier included in the data indicative of user interactions, the identifier corresponding to the content object; and retrieving the plurality of event filters associated with the identifier. The first data stream and the second data stream can each comprise a third data set of the data indicative of user interactions. The second data stream comprises the first data set. The second data stream does not comprise the first data set. The first data stream comprises no data of the data indicative of user interactions in common with the second data stream. The first filter comprises one or more first variables and the second filter comprises one or more second variables, and the one or more first variables and the one or more second variables comprise at least one of: a content object type, a content page type, or a content page uniform resource locator. The one or more first variables comprises at least one non-overlapping characteristic relative to the one or more second variables. The one or more hardware processors is configured to: generate a third data stream from the second data stream and the first sub-data stream; and output the third data stream to the plurality of analysis systems such that a fourth group of the plurality of analysis systems is prevented from accessing data of the third data stream. The data indicative of user interactions comprise a user identifier corresponding to the user system or a user of the user system. The one or more hardware processors is configured to generate the first data stream to comprise the user identifier and the first sub-data stream to comprise the user identifier. The one or more hardware processors is configured to determine a user identifier corresponding to the user system or a user of the user system by: looking up a user system identifier generated by the one or more hardware processors for the user system; requesting a vendor identifier generated by one of the plurality of analysis systems; or identifying cookie identifier generated by cookie synchronization with the user system or the plurality of analysis systems. The one or more hardware processors is configured to generate the first data stream to comprise the user identifier and the first sub-data stream to comprise the user identifier. The one or more hardware processors is configured to assign individual analysis systems of the plurality of analysis systems to the first group that have not provided an authentication credential matching an access credential for the second data stream. The one or more hardware processors is configured to assign individual analysis systems of the plurality of analysis systems to the second group that have not provided an authentication credential matching an access credential for the first sub-data stream. The one or more hardware processors is configured to assign individual analysis systems of the plurality of analysis systems to the first group that have not provided an authentication credential matching an access credential for the second sub-data stream. The tag object comprises a universal tag associated with the content object.

In some embodiments, a method for sharing data indicative of user interactions with a content object is disclosed. The method can include: receiving from a user system, via a computer network, data indicative of user interactions with a content object of a content page, the data indicative of user interactions being transmitted by the user system in response the user system executing a tag object comprising instructions to gather the data indicative of user interactions and transmit the data indicative of user interactions; accessing a first event filter corresponding to the content object from a plurality of event filters; generating a plurality of data streams from the data indicative of user interactions by filtering the data indicative of user interactions using the first event filter, the plurality of data streams comprising: a first data stream comprising a first data set of the data indicative of user interactions, and a second data stream comprising a second data set of the data indicative of user interactions which first data stream does not, the second data set being different from the first data set; accessing a second event filter corresponding to the content object from the plurality of event filters, the second event filter being different from the first event filter; generating a plurality of sub-data streams from the first data stream by filtering the first data stream using the second event filter, the plurality of sub-data streams comprising: a first sub-data stream comprising a first data subset of the first data stream, and a second sub-data stream comprising a second data subset of the first data stream which the first sub-data stream does not, the second data subset being different from the first data subset; and outputting the second data stream, the first sub-data stream, and the second sub-data stream to a plurality of analysis systems such that a first group of the plurality of analysis systems is prevented from accessing data of the second data stream, a second group of the plurality of analysis systems is prevented from accessing data of the first sub-data stream, and a third group of the plurality of analysis systems is prevented from accessing data of the second sub-data stream, the first group comprising at least some different analysis systems of the plurality of analysis systems from the second group and the third group, the second group comprising at least some different analysis systems of the plurality of analysis systems from the third group, wherein the method is performed by one or more hardware processors.

The method of the preceding paragraph can include one or more of the following features: The method can include determining an identifier included in the data indicative of user interactions, the identifier corresponding to the content object; and retrieving the plurality of event filters associated with the identifier. The first data stream and the second data stream each comprise a third data set of the data indicative of user interactions.

In some embodiments, a system for configuring sharing of user interaction data associated with a content object of a website in a computer network is disclosed. The system can include: a network interface configured to communicate with a remote computing system; a user interface configured to receive an input from a first vendor; and one or more hardware processors in communication with the network interface and the user interface, the one or more hardware processors being configured to: identify access privilege associated with the first vendor of a stream management system, wherein the first vendor receives interaction data associated with a content object of a website via an execution of a tag object in the content object; determine, based at least in part on the access privilege, a first data repository associated with the first vendor, a first event filter associated with the first vendor, and a second data repository of a second vendor, wherein the second vendor is downstream to the first vendor with respect to the interaction data where at least a portion of the interaction data flows from the first vendor to the second vendor; determine a first configuration associated with the first event filter, wherein the first configuration causes the first event filter to generate a shared data stream based at least partly on the interaction data of the content object; edit a second configuration associated with the shared data stream such that the second configuration restricts an operation by the second vendor on at least a portion of the shared data stream in the second data repository; and cause the second configuration to be automatically implemented by the second data repository of the second vendor.

The system of the preceding paragraph can include one or more of the following features: The one or more hardware processor further configured to: determine a second event filter associated with the second vendor, wherein the second event filter is configured to manage, by the second vendor, the shared data stream; and override, by the second configuration communicated from the first vendor, a third configuration of the second event filter created by the second vendor. The second event filter further causes a sub-data stream to be generated from the shared data stream from the first vendor. The sub-data stream is communicated back to the first vendor from the second vendor. The one or more hardware processors are further configured to: determine a user identifier corresponding to the computing system from which the interaction data is received; and wherein the shared data stream comprises the user identifier and data indicative of user interactions associated with the user identifier. To determine the user identifier, the one or more hardware processors are configured to at least: look up a computing system identifier generated by the one or more hardware processors for the computing system; request a vendor identifier generated by an analysis system of the first vendor; or identify cookie identifier generated by cookie synchronization with the computing system or the analysis system. The first configuration further causes the first event filter to generate a data packet for further analysis by an analysis system of the first vendor. The data packet and the shared data stream comprise at least a portion of non-overlapping data. To identify the first event filter, the one or more hardware processors are configured to: determine an identifier included in the interaction data indicative of user interactions, the identifier corresponding to the content object; and retrieve a plurality of event filters associated with the identifier, wherein the plurality of event filters comprises the first event filter. The first event filter includes one or more variables comprising: a content object type, a content page type, or a content page uniform resource locator.

In some embodiments, a method for configuring sharing of user interaction data associated with a content object of a website in a computer network is disclosed. The method can include: identifying access privilege associated with a first vendor of a stream management system, wherein the first vendor receives interaction data associated with a content object of a website via an execution of a tag object in the content object; determining, based at least in part on the access privilege, a first data repository associated with the first vendor, a first event filter associated with the first vendor, and a second data repository of a second vendor, wherein the second vendor is downstream to the first vendor with respect to the interaction data where at least a portion of the interaction data flows from the first vendor to the second vendor; determining a first configuration associated with the first event filter, wherein the first configuration causes the first event filter to generate a shared data stream based at least partly on the interaction data of the content object; editing a second configuration associated with the shared data stream such that the second configuration restricts an operation by the second vendor on at least a portion of the shared data stream in the second data repository; and causing the second configuration to be automatically implemented by the second data repository of the second vendor.

The method of the preceding paragraph can include one or more of the following features: The method can include determining a second event filter associated with the second vendor, wherein the second event filter is configured to manage, by the second vendor, the shared data stream; overriding, by the second configuration communicated from the first vendor, a third configuration of the second event filter created by the second vendor. The second event filter further causes a sub-data stream to be generated from the shared data stream from the first vendor. The sub-data stream is communicated back to the first vendor from the second vendor. The method further comprises determining a user identifier corresponding to a remote computing system from which the interaction data is received; and wherein the shared data stream comprises the user identifier and data indicative of user interactions associated with the user identifier. The method can include determining the user identifier comprises at least one of: looking up a computing system identifier; requesting a vendor identifier generated by an analysis system of the first vendor; or identifying cookie identifier generated by cookie synchronization with the computing system or the analysis system. The first configuration further causes the first event filter to generate a data packet for further analysis by an analysis system of the first vendor. The data packet and the shared data stream comprise at least a portion of non-overlapping data. The identifying the first event filter comprises: determining an identifier included in the interact data indicative of user interactions, the identifier corresponding to the content object; and retrieving a plurality of event filters associated with the identifier, wherein the plurality of event filters comprises the first event filter. The first event filter includes one or more variables comprising: a content object type, a content page type, or a content page uniform resource locator.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIG. 2B illustrates an example of data sharing among multiple systems or repositories.

DETAILED DESCRIPTION

Overview

Figure 1:
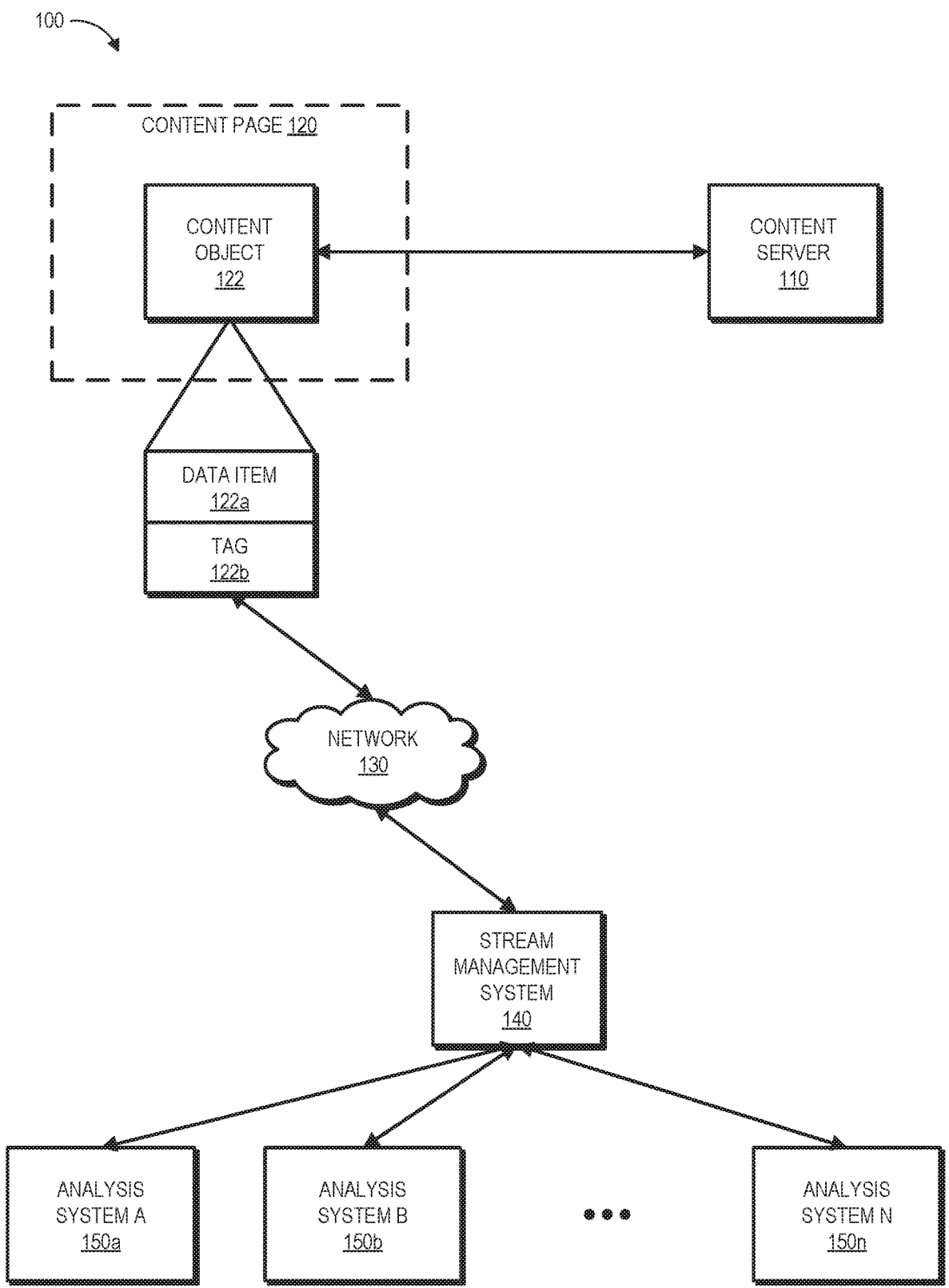
FIG. 1 depicts an example data collection system which can gather user interaction data for a content object.

Content pages (for example, web pages or mobile applications) may include one or more content objects (for example, images, texts, audios, or videos). The content objects can be from one or more providers other than the provider of the content pages. For example, an image created or generated by one provider can be included in a content page before end user delivery of the content page which may be created or operated by a provider other than the one which creates or generates the content page. The use and delivery of the content object in this manner may be desirable, for example, in situations where instructions are not required to be fixed to the content page (sometimes referred to as hardcoded) or the content object may be provided in an unknown delivery environment or data accessibility environment (for example, in mobile devices, non-script or iframe delivered via a display server, or intra video advertisements).

The content object can serve to supplement other information on the content page such as, for example, core content in a content page from a creator or operator of the content page. The content object can enable customized information, such as messages or graphics, to be dynamically displayed as part of the content page. One example of such a content object can be an advertisement from an organization to be included in a content page. A content object can further include one or more tags or a tag container that may be part of the content object and used to track user interactions with the content object or other parts of a content page in which the content object is incorporated. The tags may be associated with multiple vendors which may in turn include multiple downstream vendors (also referred to as sub-vendors).

As an example, a web page may include a content object located at a certain position in the webpage. The content object may include an animation and include tags associated with one or more primary vendors, such as three primary vendors, which track user interactions with the animations. While the web page is loading on a user computing device, the user computing device can make a request for the content object from a server. The server can parse the request and identify the content object requested. The server can return a content stack which can include the animation and computer codes (for example, tags) for the each of the 3 primary vendors.

The user computing device can begin client-side processing after receiving the content stack. However, one or more of the primary vendors may be further associated with sub-vendors. As a result, the primary vendor's codes can spawn sub-vendor codes which can further spawn more sub-vendor codes. This process may sometimes be referred to as piggybacking. As an example, a primary vendor A may load three sub-vendors, and one of the three sub-vendors may load another two sub-vendors. Similarly, a primary vendor C may load two sub-vendors where one out of the two sub-vendors may further be associated with yet another sub-vendor.

The piggyback tags can cause inefficiencies when the loading the web page. With reference to the previous example, the user computing device may initially expect to make four network requests (for example, retrieving the animation and loading information for the three primary vendors) to retrieve the information in the content stack but may actually make 12 requests (including the requests to sub-vendors) to fully load the content stack. U.S. Pat. No. 9,807,184 provides a distributed tag management in data networks which is directed to solve this problem and to provide an efficient solution for loading content stacks with the client side by providing an endpoint for single data collection and governance. The content of U.S. Pat. No. 9,807,184 is hereby incorporated by reference in its entirety.

In addition, the data sharing and streaming with piggyback tags can be non-transparent and poorly achieved because the user or the upstream vendors may not have control over how the data is used by the sub-vendors. For example, although a creator of a content page may have visibility on primary vendor's tags, the creator may not have any control or visibility to downstream vendor's access to data on the content page via the primary vendor's tags.

One solution to these problems can be to disable third-party cookies. For example, a content site can forbid third-party cookies to be used on the content site. The restriction can be implemented on a hardware level where a user computing device blocks a third party's access to cookies or other user data in the user computing device. This solution, however, may suppress information sharing and sometimes hinder the content site's ability to provide information customized to a user.

The systems and methods described herein are directed, at least in part, to provide solutions to the problems caused by piggyback tags. The solutions can allow transparent tracking of user interactions and reduce the number of network requests associated with loading the content object. For example, the data collection system described herein may use a universal tag instead of multiple tags associated with different vendors. In some implementations, the universal tag may be specific to a content object or a type of the content object. By reducing the number of tags associated with the content object, these implementations can improve computer functionalities and enhance a computer's performance by reducing bandwidth and time required to load a web page on a user computing device. Furthermore, the stream management system can allow an upstream vendor (for example, a data supplier) to control the flow of the collected data, which increases data governance and auditability by providing, to the data supplier, controls and visibilities of its data flow. For example, the stream management system can filter the collected data, set access levels for the data, communicate a subset of data to a downstream vendor (for example, a sub-vendor), and override data management instructions generated by another downstream vendor. The user identification management system can also employ various techniques for allowing a downstream vendor to recognize with which user the data is associated, thereby unifying user data set and leading to better customer experiences and analytics.

Data Collection System

FIG. 1 depicts a data collection system 100 which can gather user interaction data for a content object. The data collection system 100 can create a point of data collection associated with the content object 122. This point of data collection may be particularly advantageous, in certain embodiments, because it can eliminate the need to manage or deliver codes associated with different vendors on the data supplier's side (for example, the publisher of the content page 120) and provide control and transparency to the data supplier as to what data is collected and distributed to vendors.

In FIG. 1, a user computing device can load a content page 120 (for example, a web page). The content page 120 may include a content object 122. The content object 122 may be a data item 122a (for example, an image or an animation). The publisher of the content page 120 can use a tag 122b to track user interactions with the data item 122a. To eliminate the sub-load issues in piggyback tags, in some instances, the tag 122b may be a tag (for example, a universal tag) which contains a data collection code set (for example, a universal data collection code set). This data collection code set may be a piece of JavaScript that is specifically directed toward the content object 122. The tag can provide a point of data collection for multiple vendors instead of employing multiple tags each associated with a different vendor. As a result, when the user computing device requests the content object 122 from the content server 110, the content server 110 can return a content stack including the data item 122a and the tag 122b. Because the tag 122b may not include additional code associated with a sub-vendor, the user computing device may make two network requests (for example, for the data item 122a and the tag 122b) to load the content object 122 (instead of making more requests to load the sub-vendor's data collection code sets, for instance).

The collected data can be passed by the tag 122b to a stream management system 140 via the network 130. As further described with reference to FIG. 2A, the stream management system 140 can perform various operations on the collected data such as data augmentation such as adding environmental, geographic or demographic variables (as illustrated by the event enrichment block 232) and/or filtering the data, generating data streams (which may include data collected by one or more tags) to be supplied to downstream data vendors, communicating the data to one or more analysis systems (for example, analysis systems A 150a, B 150b, . . . N 150n) for data analysis, etc. In some implementations, the collected data can be communicated and stored in a data store, such as a cloud database or flat file system. In certain implementations, the stream management system 140 can include a user interface configured to receive user inputs for setting up and modifying filtering criteria, and manage data streams or access downstream data repositories.

Although FIG. 1 illustrates one stream management system 140, in some implementations, each vendor (including upstream or downstream vendors) may implement a stream management system to manage data analytics, access to one or more data repositories, and the generation of one or more data streams.

Stream Management System

Figure 2A:
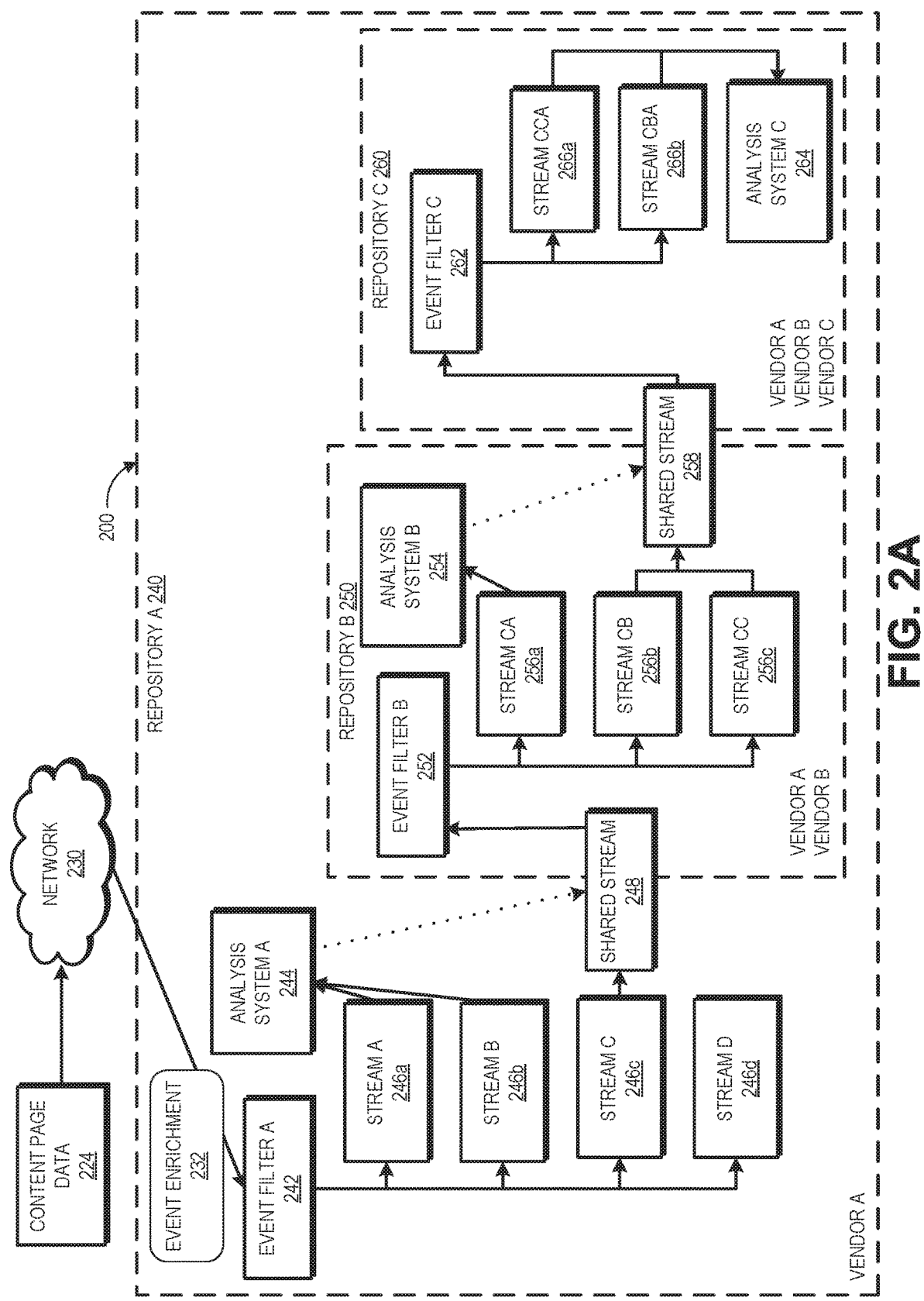
FIG. 2A depicts an example stream management system.

FIG. 2A depicts a stream management system 200. The stream management system 200 may be an embodiment of the stream management system 140 shown in FIG. 1. The stream management system 200 can be configured to specify which repositories and which data are shared between vendors. For example, the stream management system 200 can manage which data stream is a shared data stream and which will be communicated to another vendor. An owner of a repository (such as a vendor) can also specify the access privilege associated with the repository through the stream management system 200. As an example, the owner can use the stream management system 200 to specify that a repository is private so that no other vendors except the owner of the repository can access it. As another example, a repository may be viewed and accessed by vendors meeting certain criteria such as that the type of the vendors, whether the vendors have certain data privacy policy, what type of analysis the vendors will perform on the data, whether the vendors are in certain geographical regions, etc.

In FIG. 2A, the stream management system 200 is shown to include three repositories (each can be associated with one or more different vendors or set of vendors), and each repository may be associated with one or more vendors. For example, a repository A 240 may be part of the stream management system 200 associated with vendor A and not vendors B and C; a repository B 250 may be part of the stream management system 200 associated with vendors A and B and not vendor C; and a repository C 260 may be part of the stream management system 200 associated with vendors A, B, and C. The repositories can each be virtually or physically separated from one another, or a combination thereof, in some instances. Moreover, one or more repositories may be a part of one or more other repositories. In this example, the stream management system 200 may be associated with vendor A. As further described below, vendor A can manage the data repositories of vendors B and C because the vendors B and C are sub-vendors of vendor A.

As illustrated by FIG. 2A, content page data 224 can be communicated to the stream management system 200 via the network 230. The content page data 224 may be collected by a tag, such as the tag 122b shown in FIG. 1. The content page data 224 can include data related to user interactions with a content object, such as the content object 122, and may be associated with one or more events (for example, when a user clicks on an advertisement). In some implementations, the content page data 224 can include data from other content objects, or multiple content pages, in combination or the like.

At the stream management system 200, the content page data 224 can be processed by the repository A 240. The repository A 240 may be part of the stream management system 200 associated with a vendor A. Vendor A can configure processing of the content page data 224 using the event filter A 242. The event filter A 242 may include a variety of filtering criteria. The filtering criteria may be based on the values of variables in the content page data 224 or variables in the one or more events associated with the content page data 224, in combination or the like. For example, the filtering criteria may include a type of user interaction, a condition of the event, a domain associated with a user interaction, or a type of a user device (for example, a mobile device or desktop) from which the content page data is collected, in combination or the like. Additionally or alternatively, the filtering criteria may include conditions for passing data to other vendors, such as what types of data should be passed to downstream vendors, and so on. In case where the downstream vendors can access the repository (instead of receiving data from the upstream vendors), the conditions may also be used for specifying to which repository or which portion of the repository the downstream vendors are authorized to access.

As an example of filtering the content page data 224, the event filter A 242 may be based on domain names associated the content page data 224. Assuming that the content page data 224 includes four domain names, the event filter A may separate the content page data 224 into four data streams (stream A 246a, stream B 246b, stream C 246c, and stream D 246d) with each data stream being associated with a different domain name.

The filtering criteria may be based on variables in an event. For example, an event in the content page data 224 may include values for a set of variables such as the URL, the content page width, the cookies, and so on. The event filter A 242 may be configured to select a subset of variables for which the data will be passed to a downstream vendor. In one example, the event filter A 242 may be configured to pass the values associated with the content page width and URLs to the downstream vendors and may not pass other variables such as the user's email address to the downstream vendors.

Data processing by the repositories B 250 and C 260 may be controlled and filtered using similar techniques as used by the repository A 240. For example, as shown in FIG. 2A, the event filter B 252 can filter a shared stream 248 from repository A 240 and, in turn, produce three streams (sometimes also referred to as sub-data streams). Among the three streams, stream CA 256a can be used by the analysis system B 254 while stream CB 256b and stream 256c can be used to create a shared stream 258. Vendor B can become a supplier and communicate the shared stream 258 to the repository C 260. The event filter C 262 can filter the shared stream 258 where two resulting streams (for example, stream CCA 266a and stream CBA 266b) can be created. The two streams may further be communicated to an analysis system C 264 for data analytics.

The stream management system 200 can apply the filtering criteria alone or in combination. For example, the stream management system 200 can first apply a filtering criterion based on the values of one or more variables of the event and then apply another filter to select a subset of variables. As another example, the stream management system 200 can apply a filter which includes both a condition based on the values of one or more variables of the event and another condition based on a subset of variables.

Although the data streams A, B, C, D (246a, 246b, 246c, 246d, respectively) generated with the event filter A 242 in FIG. 2A, multiple event filters may be used to generate these data streams. These event filters may be created based on different criteria. Further, although the event filters A, B, and C are illustrated as separate from the analysis systems A, B, and C, in certain implementations, the event filters A, B, and C may be part of the analysis systems A, B, and C respectively.

A portion of the content page data 224 may be in multiple data streams after the content page data 224 is filtered by the repositories. For example, the interaction data of a user may be filtered by the repository A 240 into both the stream C 246c (which may be communicated to a downstream vendor) and in the stream A 246a (which may be analyzed by an analysis system A 244). In certain implementations, at least a portion of the data analytics derived by the analysis system A 244 can be shared with other data vendors. For example, as illustrated by the dashed arrow between the analysis system A 244 and the shared stream 248, the analysis system A 244 can feed a portion of the data analytics into the shared data stream 248 for sharing with the repository B 250. Although in this example, the analysis system A 244 feeds the data analytics to repository B as part of the shared stream 248, in some implementations, the data analytics may be communicated to a downstream vendor in a separate data stream.

In certain implementations, two or more data streams may not include the same data set or an overlapping data set. For example, stream A 246a may be associated with a certain domain name while stream B 246b may be associated with another domain name, where data for domain A does not overlap with data for domain B.

The data streams may be routed to different systems. For example, the data stream A 246a and the data stream B 246b may be communicated to one or more application program interfaces (APIs) as the end point. The one or more APIs may be associated with the analysis system A 244 where the data stream A 246a and the data stream B 246b may be analyzed. As another example, the data stream C 246c may become a shared stream 248 which is communicated to the repository B 250. In some implementations, the shared stream 248 feeding into the repository B 250 may include other data in addition to the data stream C 246c. The stream management system 200, however, may not be used to perform an action on the data stream. For example, the data stream D 246d may be communicated to neither the analysis system A 244 nor a downstream repository. Additionally or alternatively, the stream management system 200 may create a new repository associated with a data stream or communicate a data stream to a repository. The owner of the repository or an upstream vendor can specify whether a downstream vendor can have access to the data stream by configuring access privilege of the repository.

Although one shared stream (for example, shared stream 248) is created by the repository A 240 from the content page data 224, in some implementations, the stream management system 200 can create multiple shared streams. For example, the stream D 246d may be part of another shared stream which may be communicated to a vendor other than vendor B, such as vendor C in some instances.

The stream management system 200 can be configured to take into account access privileges for the repositories, such as which vendors should have access to which repositories and the repository processed data. For example, repository A 240 can be accessed by vendor A but not by other vendors such as vendors B and C. In some implementations, a repository may be accessed by multiple vendors. For example, repository B 250 can be accessed by both vendors A and B but not by vendor C, and repository C 260 can be accessed by vendors A, B, and C.

A vendor can access multiple repositories. The vendor can view data in these repositories. The vendor can also configure access rules for one or more repositories. For example, a vendor can view data in one repository as well as in any downstream repositories from the one repository. As shown in FIG. 2A, vendor A can access the repository A 240 and its downstream repositories B 250 and C 260. Similarly, vendor B may have access to the repository B 250 and its downstream repository C 260. Allowing a vendor to access downstream repositories can be particularly advantageous, in certain embodiments, because it provides transparency of data flow so that the vendor is informed as to where the shared downstream data is provided.

In some implementations, an upstream vendor can override stream configurations of a downstream repository. For example, the upstream vendor can control who has access to the downstream repository, as well as where the data in the downstream repository will flow. As an example, vendor A can change the event filter B 252 in the repository B 250 to prevent a certain data set from being included in the shared stream 258, even though the repository B 250 may be otherwise controlled or managed by vendor B. As another example, vendor A can limit the access to the repository B 250 to vendors A and B. As a result, another vendor may not be able to access data in the repository B. As yet another example, vendor B may choose to share the stream CA 256a with vendor D (not shown in FIG. 2), either by communicating the stream CA 256a to vendor D or by allowing vendor D to have access to the stream CA 256a in vendor B's data store. However, vendor A can override vendor B's authorization for accessing the stream CA 256a. For example, vendor A can revoke vendor D's privilege for accessing the stream CA 256a. Additionally or alternatively, vendor A can limit which vendor can configure the repository B. For example, vendor A may set that vendors A and B can determine who is authorized to configure the repository B 250. Therefore, vendor C may not be able to configure the access rules for the repository B 250.

Although in the examples, the shared data stream are described to flow from one or more upstream vendors to one or more downstream vendors, this data flow is not intended to be limiting. As an example, a shared data stream from the repository B 250 may be communicated back to the repository A 240. This implementation may be advantageous, in certain embodiments, because the repository B 250 can receive data from sources other than the repository A 240, and the repository B 250 may apply a different filter than the repository A 240. As a result, the repository B 250 may include data that are not in the shared stream 248. The data management system associated with the repository A 240 may perform additional analysis or generate a new stream based on the received data stream after receiving the data stream from the repository B 250.

In some implementations, one or more vendors may be the publisher of the content site. For example, vendor A may be the publisher of the content site at which the user interaction is collected. Further, a data stream may be communicated to multiple downstream vendors. In the same example where vendor A is the publisher of the content site, the content page data 224 may be communicated to the repository A 240, as well as to another vendor where the data will be further processed or analyzed. As another example, the shared stream 248 can be communicated to multiple repositories (including the repository B), where each repository may further process the shared stream 248.

FIG. 2B illustrates an example of data sharing among multiple systems or repositories. FIG. 2B shows two analysis systems 244 and 254 and two repositories 240 and 280. The analysis system A 244 can be associated with a repository A 240. Both the analysis system A 244 and the repository A 240 can be owned by vendor A or be managed by the shared stream management system 200 of vendor A. The analysis system B 254 can be associated with vendor B (which may be a downstream vendor to vendor A). The repository D may be associated with vendor D. In certain implementations, the analysis system A 244 or the analysis system B 254 shown in FIG. 2B may substituted by a stream management system for vendor A and another stream management system for vendor B, respectively.

At (1), the analysis system A 244 can receive a data stream 270. The data stream 270 may include a shared data stream from a vendor upstream to vendor A, content page data acquired by one or more tags 122b, or data stored in the repository A 240. As described with reference to FIG. 2A, the analysis system A 244 can perform data analytics on the data stream 270, or apply one or more event filters to the data stream 270. The analysis system A 244 can generate one or more shared data streams which can be communicated to another vendor. In certain implementations, rather than communicating the data stream to another vendor, the analysis system A 244 can communicate the data sharable with other vendors to a repository which can be accessed by other vendors.

At (2), the analysis system A 244 can communicate the output of the analysis system A 244 to the repository A 240. The output may include data streams where one or more data streams may be associated with flags that indicate that the data streams are sharable with other vendors. The data streams can also include results of analysis on the data stream 270. For example, the data streams can include predicted user responses to certain types of advertisements. The repository A 240 can be configured to store private data 274 which may not be sharable to vendors other than vendor A, as well as shared data stream(s) 272. Whether a data stream sharable (or non-sharable) or to whom the data stream is shared can be based on the flags attached by the data analysis system A. As described with reference to FIG. 2A, the stream management system 200 associated with the repository A can also be used to manage data flow or whether a data stream is private or sharable with other vendors.

At (3), the analysis system B 254 can communicate with the repository A 240 and access shared data stream. The repository A 240 can be configured such that the analysis system B 254 is not visible to the data that is not shared with vendor B. As described with reference to FIG. 2A, the analysis system B 254 can also perform data analytics or filtering on the shared data stream accessed from the repository A.

Optionally at (4), the output of the analysis system B 254 (e.g., another data stream 276) can be communicated back to the repository A 240 (or to the analysis system A 244), and thus enable a downstream vendor to feed data back to the upstream data vendor. In certain implementations, the data stream 276 can communicate back to the repository A 240 data that are not from vendor A (such as, for example, data shared by another vendor to vendor B, data acquired by vendor B's tags, or data analytics generated by the analysis system B 254).

In certain implementations, one repository can also obtain shared data streams from another repository. As shown at (5), the repository A 240 can communicate with the repository D 280 and receive another shared data stream 278.

Although the examples in FIGS. 2A and 2B are described with reference to sharing a data stream, similar techniques may also be used for sharing a data item such as an email, a message, a user interaction with a content object, etc.

User Identification Management System

Data suppliers and downstream vendors may employ different techniques to identify the same user. For example, publishers of different content sites may generate different user identifiers (IDs) to describe the same user. In addition, a user may use multiple devices to view the same content site, where each device may be associated with a different ID. To provide an improved user experience and improve the accuracy in data analytics, a user identification management system may consolidate data associated with the same user acquired from different content sites or from different user computing devices. The user identification management system may be part of or used in combination with a stream management system, such as the stream management system 140 shown in FIG. 1. In certain implementations, the user identification management system can also be part of an analysis system, such as for example the analysis systems A 244, B 254, or C 264 shown in FIG. 2A.

The user identification system may use an ID, such as a persistent ID, which is shared between the data supplier and downstream vendors. The ID may be obtained from a data supplier or be generated by the user identification system. Additionally or alternatively, the user identification management system can allow systems that share the data stream to access each other's user IDs. As further described herein, the user identification system may use a publisher keyed system, a visitor stitching system, or a master ID generated by the user identification system, alone or in combination, to provide a unified data set of a user. The process of obtaining and generating an ID may occur in real-time when the content page 120 requests the content object 122.

Data Supplier Persistent ID

The user identification system may use a persistent ID of a user. The persistent ID may remain the same across multiple content sites or across multiple devices. The persistent ID may be obtained from a data supplier (for example, a publisher or a website), a user device, or from a third party. Additionally or alternatively, the user identification system may identify a user or a user device using a semi-persistent device ID. Examples of the semi-persistent device identifiers may include Apple ID for Advertisers (IDFA) or Android Advertising IDs. The user identification system may receive the semi-persistent device ID from a user's device (for example, a smartphone), where the device ID is associated with the user's interactions with a content item on a particular device.

The user identification management system can obtain the persistent ID using cookie synchronization. As an example, when a content page on a user computing device loads, the browser may call a third party using a uniformed resource locator (URL). The third party URL may include a cookie of the user. The user identification management system can communicate with the third party URL and receive the cookie of the user as recorded by the third party site. The user identification management system can perform the same process with multiple data suppliers and therefore retrieve the IDs of the same user from multiple data suppliers.

In some implementations, the user identification management system can associate the IDs obtained from multiple data suppliers with a persistent ID generated by the user identification management system. The user identification management system can provide a mapping of the IDs among different data suppliers and pass the mapping information between the multiple data suppliers to enable a data supplier to access data obtained by another data supplier.

In other implementations, the ID obtained from the third party may have already been associated with multiple data suppliers. Therefore, the user identification management system can use this ID as a persistent ID for passing information across these data suppliers.

As an example, the persistent ID may be a data management platform (DMP) ID. The DMP may be a centralized platform that aggregates data from different sources. For example, DMP can gather data related to the user's personal information (for example, email address, name, phone numbers, demographic information, purchase histories, and so on). The data may be generated on a content site or other sites associated with the content site. For example, the DMP can gather data on the user's purchase history on an e-commerce website as well as the user's browsing history on a search engine. The DMP may gather this data to predict the user's purchase interests.

Another example is Google™ advertising ID. The advertising ID may be associated with a mobile application where the user's activities with the mobile application are recorded and communicated to another system (such as an analysis system) using the advertising ID.

The persistent ID may be one associated with an advertisement exchange platform. For example, the advertisers using the ad exchange platform may use the same naming convention for generating a user ID. As a result, a user ID obtained from one advertiser may also be associated with the same person in a content object provided by another advertiser.

Persistent ID Associated with Stream Management System

In addition to or in alternative to obtaining a persistent ID from a third party, a stream management system, such as the stream management system 140 of FIG. 1, may obtain or generate a first party user ID and use the user ID as the persistent ID for communicating with downstream vendors. The stream management system may use cookie sync to match the persistent ID generated by the stream management system with the user IDs generated by the third party downstream vendors. Such a matching service can also be controlled by the data supplier.

Using the persistent ID generated by the stream management system for sharing data with downstream vendors may be advantageous, in certain embodiments, because it can protect data suppliers from data leakage (due to sharing user IDs with other vendors) but can allow downstream vendors to obtain user information even though the user IDs used in the downstream vendors may be different from the data supplier.

An example of generating a user ID using a system, such as the stream management system 140, is described in U.S. Pat. No. 8,990,298, the disclosure of which is hereby incorporated in its entirety.

Stitched System ID

The user identification management system can also use a visitor stitching system to connect various user IDs used by different vendors and can deliver these IDs in the shared data streams. This aggregation can advantageously, in certain embodiments, enable one time collection of vendor user IDs across devices for identification of downstream vendor's APIs. This technique may be used to pool data gathered from different vendors.

An example of the visitor stitching system is described in U.S. Pat. No. 8,805,946, the disclosure of which is hereby incorporated in its entirety.

Managing Data Streams

Figure 3:
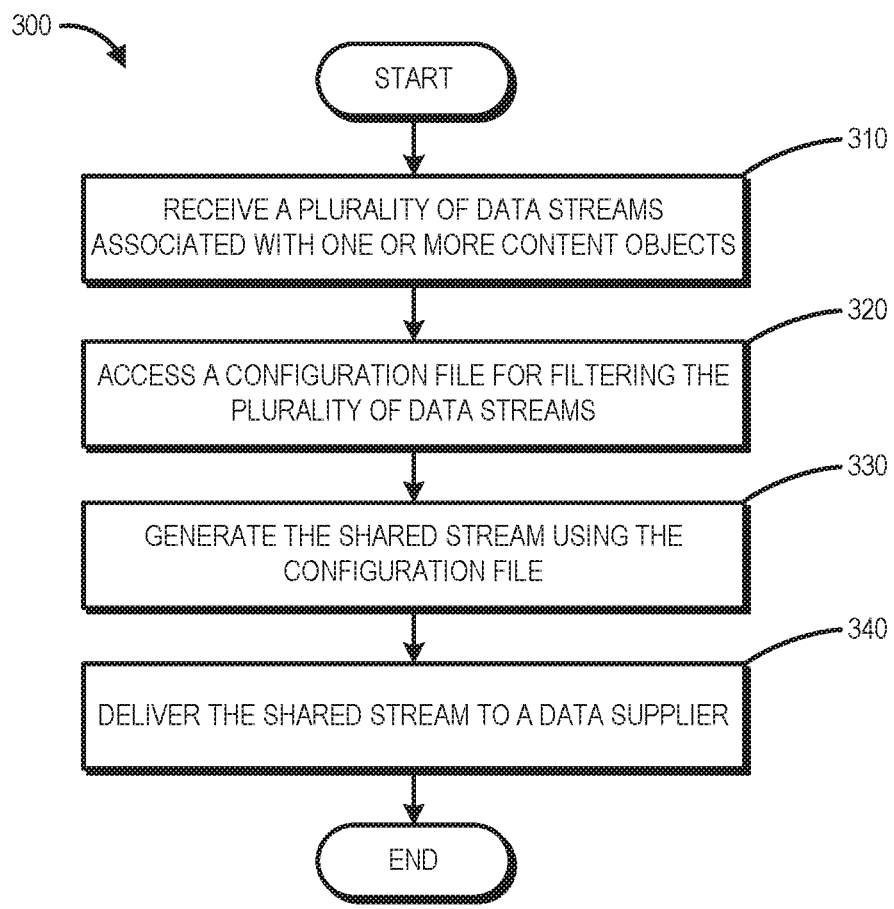
FIGS. 3 and 4 illustrate example processes for managing data streams for a data supplier.

FIG. 3 illustrates a process 300 for managing data streams for a data supplier. The process 300 may be performed by a stream management system, such as the stream management system 140 of FIG. 1. Advantageously, in certain embodiments, the process 300 can enable an upstream data vendor to control its data flow to increase data transparency and reduce or remove reliance on piggyback tags.

At block 310, the stream management system can receive a plurality of data streams associated with one or more content objects. The content objects may be from one or more content sites. As an example, the plurality of data streams may include a data stream which records user interactions with an advertisement on a web page while another data stream records user interaction with an image on the web page. As another example, the plurality of data streams may include a data stream from a movie website and another data stream from a shopping website.

At block 320, the stream management system can access a configuration file for filtering the plurality of data streams. The configuration file may be an embodiment of the event filters (for example, event filter A 242, event filter B 252, and event filter C 262) discussed with respect to FIG. 2A. The configuration file may include criteria to extract a subset of data from the data in the plurality of data streams or adjust or supplement the subset of data.

At block 330, the stream management system can generate the shared stream using criteria in the configuration file. For example, the stream management system can use the criteria to identify a subset of data that may be used to share with a downstream vendor. The shared stream may also include data that are not part of the plurality of data streams received. For example, the shared stream may include a persistent ID generated by the stream management system. As another example, the shared stream may also include data that was previously received, such as the user's personal information or information received from other data suppliers.

In some implementations, the stream management system can identify multiple sets of data to be shared with multiple downstream vendors. Some data may be included in multiple sets of data. There may also be two data sets that do not have any overlaps of data.

At block 340, the stream management system can deliver the shared stream to a downstream vendor, which may also be a data supplier. The downstream vendor can in turn deliver the data to another downstream vendor. A user's data may be shared with multiple vendor systems using a persistent ID or through sharing of the user IDs between an upstream vendor and a downstream vendor. The IDs may be communicated as part of the shared stream. In certain implementations, the IDs or the rules associated with generating the IDs are separate communicated from the shared stream. As described with reference to FIG. 2B, in some embodiments, the downstream data vendor can access a data repository of the upstream vendor to retrieve the shared stream. Thus, the upstream vendor may not need to pass the data stream itself to the downstream data vendor directly.

Although not shown in the process 300, in some implementations, the downstream vendor can process the shared data stream and feed the processed data stream back to the upstream vendor. For example, the downstream vendor can perform data analytics on the shared data stream and feed the results of the data analytics back to the upstream vendor.

Figure 4:
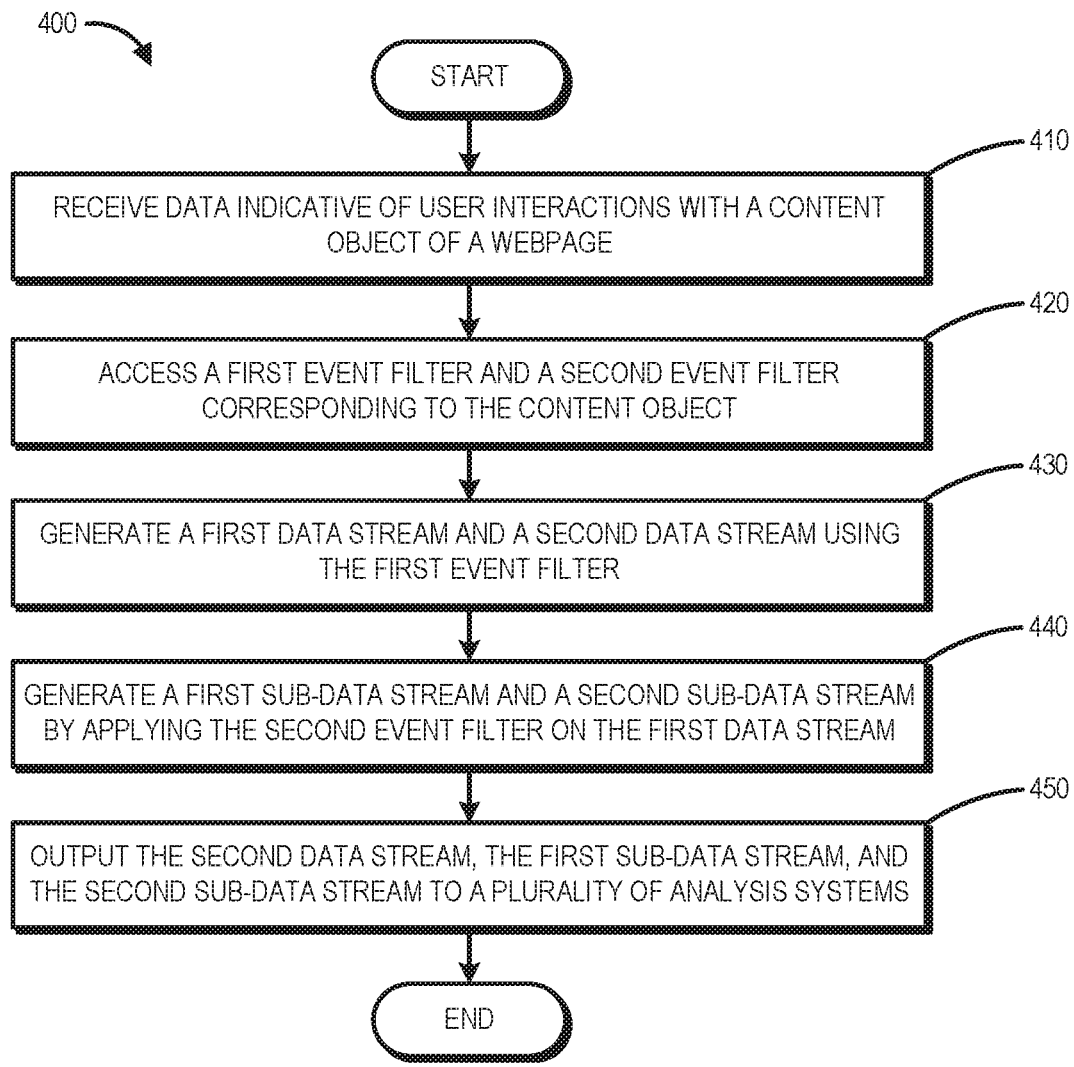

FIG. 4 illustrates a process 400 for managing data streams for a data supplier. The process 400 may be performed by a stream management system, such as the stream management system 140 of FIG. 1.

Advantageously, in certain embodiments, the process 400 can enable the stream management system 140 to control downstream data flows, such as by feeding data streams to different downstream vendors.

At block 410, the stream management system can receive data indicative of user interactions with a content object of a content site, such as a web page. The data indicative of user interactions may include, for example, whether the user has viewed the content object, how long the user has viewed the object, identifying information of the user (such as user ID, demographic information, personal information, and so on), or the like.

At block 420, the stream management system can access a first event filter and a second event filter corresponding to the content object. The first event filter may be associated with a first repository while the second event filter may be associated with a second repository. The first event filter and the second event filter may be embodiments of the event filters (for example event filter A 242, event filter B 252, and event filter C 262) discussed with respect to FIG. 2A.

At block 430, the stream management system can apply the first event filter to the user interaction data and generate at least a first data stream and a second data stream. The stream management system may communicate the first data stream to the second repository. The first data stream and the second data stream may include at least partly different data sets. In some implementations, the first data stream and the second data stream may have a portion of overlapped data.

At block 440, the stream management system can generate a first sub-data stream and a second sub-data stream by applying the second event filter to the first data stream. The first sub-data stream and the second sub-data stream may have at least some overlapping data.

At block 450, the stream management system can output the data streams, such as the first sub-data stream, the second sub-data stream, and the second data stream to a plurality of analysis systems. For example, the three data streams may be communicated to three separate analysis systems. As another example, one or more data streams may be communicated to the same analysis system. For example, the first sub-data stream and the second sub-data stream may be communicated to the same analysis system, although the analysis system may perform different analyses on these two sub-data streams. Similarly, the first sub-data stream and the second data stream may be communicated to the same analysis system.

Furthermore, a data stream may be communicated to more than one analysis system. For example, the second data stream may be communicated to an analysis system by itself and be communicated to another analysis system together with the first sub-data stream.

Some of the analysis systems may be prevented from accessing data streams that are communicated to other analysis systems. For example, an analysis system that receives the second data stream may be prevented from accessing the first data stream, the first sub-data stream, or the second sub-data stream. In some embodiments, an upstream data vendor can set the privilege or override the downstream data vendor's authorization. For example, an upstream data vendor may share a data stream with a downstream data vendor which may further allow another data vendor (or a data analysis system) to access a sub-stream of the shared data stream. The upstream data vendor, however, can override the downstream data vendor's authorization to access the sub-stream by the other data vendor. As a result of this override, the other data vendor may not have access to the sub-stream of the shared data stream. As another example, an upstream data vendor may set certain criteria for accessing the shared data stream (or a portion of the shared data stream). For example, although the shared data stream can be accessed by the downstream vendor, in order for the downstream vendor to share the data stream with the other data vendor, the other data vendor must meet certain criteria set by the upstream data vendor, such as, for example, having certain data privacy policy, being in a certain geographical region, etc.

TERMINOLOGY

Many other variations than those described herein will be apparent from this disclosure. For example, depending on the embodiment, certain acts, events, or functions of any of the algorithms described herein can be performed in a different sequence, added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, state machine, combinations of the same, or the like. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for sharing user data associated with a content object, the system comprising:
    a memory device configured to store first user data that is generated by a user system and associated with a first content object of a plurality of content objects; and
    one or more processors in communication with the memory device, the one or more processors being configured to:
        determine an identifier from the first user data, the identifier corresponding to the user system or a user of the user system;
        access, from a plurality of filters, a first filter and a second filter that correspond to the first content object,
        filter the first user data with the first filter to generate a first data stream and a second data stream different from the first data stream, the first data stream comprising the identifier,
        filter the first data stream with the second filter to generate a first sub-data stream and a second sub-data stream different from the first sub-data stream, the first sub-data stream comprising the identifier,
        output the second data stream, the first sub-data stream, and the second sub-data stream to application program interfaces of analysis systems,
        prevent, according to an access policy, at least some of the analysis systems from accessing the second data stream, the first sub-data stream, and the second sub-data stream,
        change the second filter responsive to a first user input and subsequently filter the first data stream with the second filter to adjust generation of the first sub-data stream and the second sub-data stream, and
        change the first filter and the second filter responsive to a second user input and subsequently filter the first user data with the first filter and the first data stream with the second filter to adjust generation of the first data stream, the second data stream, the first sub-data stream, and the second sub-data stream.

2. The system of claim 1, wherein the one or more processors is configured to:
    determine an object identifier from the first user data, the object identifier corresponding to the first content object; and
    access, from the plurality of filters, the first filter and the second filter according to the object identifier.

3. The system of claim 1, wherein the first user data comprises the identifier.

4. The system of claim 1, further comprising a communication interface configured to receive the first user data from the user system via a computer network, and the first user data comprises data indicative of user interactions with the first content object.

5. The system of claim 4, wherein the first content object is an image.

6. The system of claim 1, wherein the one or more processors is configured to determine whether individual analysis systems of the analysis systems are permitted to access the second data stream, the first sub-data stream, and the second sub-data stream from authentication credentials provided by the analysis systems.

7. The system of claim 1, wherein the one or more processors is configured to:
    access, from the plurality of filters, a third filter and a fourth filter that correspond to a second content object of the plurality of content objects, the third filter and the fourth filter being different from the first filter and the second filter;
    filter second user data with the third filter to generate a third data stream and a fourth data stream different from the third data stream, the second user data being generated by the user system and associated with the second content object;
    filter the third data stream with the fourth filter to generate a third sub-data stream and a fourth sub-data stream different from the third sub-data stream; and
    output the fourth data stream, the third sub-data stream, and the fourth sub-data stream to the application program interfaces.

8. The system of claim 7, wherein the third data stream comprises the identifier, and the third sub-data stream comprises the identifier.

9. The system of claim 1, wherein the one or more processors is configured to:
    generate a third data stream from the second data stream and the first sub-data stream;
    output the third data stream to the application program interfaces; and
    prevent, according to the access policy, at least one of the analysis systems from accessing the third data stream.

10. The system of claim 1, wherein the first filter comprises a variable that is a content object type, a content page type, or a content page uniform resource locator.

11. The system of claim 1, wherein the first data stream comprises at least some overlapping data with the second data stream.

12. The system of claim 1, wherein the first data stream comprises no overlapping data with the second data stream.

13. The system of claim 1, wherein the one or more processors is configured to:
    permit, according to the access policy, a first analysis system of the analysis systems to access the second data stream, the first sub-data stream, and the second sub-data stream; and
    prevent, according to the access policy, a second analysis system of the analysis systems from accessing the second data stream or the first sub-data stream.

14. A method for sharing user data associated with a content object, the method comprising:
    storing, by a memory device, first user data that is generated by a user system and associated with a first content object of a plurality of content objects;

determining an identifier from the first user data, the identifier corresponding to the user system or a user of the user system;

accessing, from a plurality of filters, a first filter and a second filter that correspond to the first content object;

filtering, by one or more processors, the first user data with the first filter to generate a first data stream and a second data stream different from the first data stream the first data stream comprising the identifier;

filtering, by the one or more processors, the first data stream with the second filter to generate a first sub-data stream and a second sub-data stream different from the first sub-data stream, the first sub-data stream comprising the identifier;

outputting the second data stream, the first sub-data stream, and the second sub-data stream to application program interfaces of analysis systems;

by the one or more processors, preventing, according to an access policy, at least some of the analysis systems from accessing the second data stream, the first sub-data stream, and the second sub-data stream;

changing, by the one or more processors, the second filter responsive to a first user input and subsequently filtering the first data stream with the second filter to adjust generation of the first sub-data stream and the second sub-data stream; and changing, by the one or more processors, the first filter and the second filter responsive to a second user input and subsequently filtering the first user data with the first filter and the first data stream with the second filter to adjust generation of the first data stream, the second data stream, the first sub-data stream, and the second sub-data stream.

15. The method of claim 14, further comprising:
determining an object identifier that is included in the first user data and corresponds to the first content object,
wherein said accessing is performed using the object identifier.

16. The method of claim 14, further comprising:
accessing, from the plurality of filters, a third filter and a fourth filter that correspond to a second content object of the plurality of content objects, the third filter and the fourth filter being different from the first filter and the second filter;
filtering second user data with the third filter to generate a third data stream and a fourth data stream different from the third data stream, the second user data being generated by the user system and associated with the second content object;
filtering the third data stream with the fourth filter to generate a third sub-data stream and a fourth sub-data stream different from the third sub-data stream; and
outputting the fourth data stream, the third sub-data stream, and the fourth sub-data stream to the application program interfaces.

17. The method of claim 16, wherein the third data stream comprises the identifier, and the third sub-data stream comprises the identifier.

18. The method of claim 14, further comprising:
generating a third data stream from the second data stream and the first sub-data stream;
outputting the third data stream to the application program interfaces; and
preventing, according to the access policy, at least one of the analysis systems from accessing the third data stream.

19. Non-transitory physical computer storage comprising computer-executable instructions stored thereon that, when executed by one or more processors, are configured to implement a process comprising:
storing, by a memory device, first user data that is generated by a user system and associated with a first content object of a plurality of content objects;
determining an identifier from the first user data, the identifier corresponding to the user system or a user of the user system;
accessing, from a plurality of filters, a first filter and a second filter that correspond to the first content object;
filtering the first user data with the first filter to generate a first data stream and a second data stream different from the first data stream, the first data stream comprising the identifier;
filtering the first data stream with the second filter to generate a first sub-data stream and a second sub-data stream different from the first sub-data stream, the first sub-data stream comprising the identifier;
outputting the second data stream, the first sub-data stream, and the second sub-data stream to application program interfaces of analysis systems;
preventing, according to an access policy, at least some of the analysis systems from accessing the second data stream, the first sub-data stream, and the second sub-data stream;
changing the second filter responsive to a first user input and subsequently filtering the first data stream with the second filter to adjust generation of the first sub-data stream and the second sub-data stream; and
changing the first filter and the second filter responsive to a second user input and subsequently filtering the first user data with the first filter and the first data stream with the second filter to adjust generation of the first data stream, the second data stream, the first sub-data stream, and the second sub-data stream.

20. The non-transitory physical computer storage of claim 19, wherein the process comprises:
accessing, from the plurality of filters, a third filter and a fourth filter that correspond to a second content object of the plurality of content objects, the third filter and the fourth filter being different from the first filter and the second filter;
filtering second user data with the third filter to generate a third data stream and a fourth data stream different from the third data stream, the second user data being generated by the user system and associated with the second content object;
filtering the third data stream with the fourth filter to generate a third sub-data stream and a fourth sub-data stream different from the third sub-data stream; and
outputting the fourth data stream, the third sub-data stream, and the fourth sub-data stream to the application program interfaces.

* * * * *

UNITED STATES PATENT AND TRADEMARK OFFICE
CERTIFICATE OF CORRECTION

PATENT NO. : 10,558,728 B2  
APPLICATION NO. : 16/132054  
DATED : February 11, 2020  
INVENTOR(S) : Christopher B. Slovak Page 1 of 1

It is certified that error appears in the above-identified patent and that said Letters Patent is hereby corrected as shown below:

On the Title Page

Column 1, Item (73), Line 1, under Assignee, delete "Deigo" and insert --Diego--.

In the Claims

In Column 21, Line 8, Claim 14, delete "first data stream" and insert --first data stream,--.

Signed and Sealed this
Nineteenth Day of May, 2020

Andrei Iancu
*Director of the United States Patent and Trademark Office*